(12) United States Patent
Zeng

(10) Patent No.: US 9,967,947 B1
(45) Date of Patent: May 8, 2018

(54) LED DRIVING CIRCUIT FOR CONTROLLING LEAKAGE CURRENT AND COMPATIBLE WITH BALLAST

(71) Applicant: DONGGUAN PAN AMERICAN ELECTRONICS CO., LTD., DongGuan (CN)

(72) Inventor: Jun Zeng, DongGuan (CN)

(73) Assignee: DONGGUAN PAN AMERICAN ELECTRONICS CO., LTD., DongGuan (CN)

( * ) Notice: Subject to any disclaimer, the term of this patent is extended or adjusted under 35 U.S.C. 154(b) by 0 days. days.

(21) Appl. No.: 15/616,426

(22) Filed: Jun. 7, 2017

(30) Foreign Application Priority Data

Mar. 23, 2017 (CN) .......................... 2017 1 0180511

(51) Int. Cl.
H05B 33/08 (2006.01)

(52) U.S. Cl.
CPC ..... *H05B 33/0887* (2013.01); *H05B 33/0809* (2013.01)

(58) Field of Classification Search
CPC ........ H05B 6/00; H05B 7/152; H05B 31/006; H05B 31/22; H05B 31/28; H05B 41/048
USPC ......... 315/121, 247, 294, 122, 169.3, 185 R, 315/201
See application file for complete search history.

(56) References Cited

U.S. PATENT DOCUMENTS

| 5,412,526 | A  | * | 5/1995  | Kapp ..................... H02H 3/046 360/111 |
| 6,034,611 | A  | * | 3/2000  | Brooks ................ G01R 31/025 324/424 |
| 9,462,655 | B1 | * | 10/2016 | Davis ................. H05B 33/0887 |
| 2010/0164403 | A1 | * | 7/2010 | Liu ....................... H05B 33/086 315/297 |
| 2012/0043892 | A1 | * | 2/2012 | Visser ..................... F21V 25/04 315/121 |
| 2016/0081147 | A1 | * | 3/2016 | Guang ............... H05B 33/0803 315/123 |

* cited by examiner

*Primary Examiner* — Douglas W Owens
*Assistant Examiner* — Wei Chan
(74) *Attorney, Agent, or Firm* — Platinum Intellectual Property LLP

(57) ABSTRACT

An light emitting diode (LED) driving circuit for controlling a leakage current and compatible with a ballast includes: an input circuit including buffer capacitors CX1, CX2, CX3; discharging resistor strings RX1, RX2, RX3; fuses F1, F2, F3; piezoresistors VR1, VR2, VR3; a plurality of output terminals each of which comprising a first rectifying connection terminal; a second rectifying connection terminal; a third rectifying connection terminal; and a fourth rectifying connection terminal; and a plurality of input terminals each of which including a first electrical energy connection terminal; a second electrical energy connection terminal; a third electrical energy connection terminal; and a fourth electrical energy connection terminal; and a rectifying circuit connected to the input circuit; a power supply control module including a positive electrode connection terminal, a signal receiving terminal, a positive supply terminal, and a negative supply terminal.

10 Claims, 3 Drawing Sheets

US 9,967,947 B1

LED DRIVING CIRCUIT FOR CONTROLLING LEAKAGE CURRENT AND COMPATIBLE WITH BALLAST

RELATED APPLICATIONS

This application claims priority under 35 U.S.C. § 119 to Chinese Patent Application No. 201710180511X, filed on Mar. 23, 2017, the entire content of which is incorporated herein in its entirety.

FIELD OF THE INVENTION

The present disclosure relates to an electronic circuit, and particularly relates to an light emitting diode (LED) driving circuit for controlling a leakage current and compatible with a ballast.

BACKGROUND OF THE INVENTION

An LED driving circuit is an important part of LED lamps, which is used to access the AC (alternating current) power supply, and convert AC current to DC current for providing the power supply to the LED load. The LED driving circuit has two input terminals, which are connected to the live line and the neutral line of the mains. In the assembly or maintenance process of LED lamps, there will be a case that one input terminal of the LED driving circuit is connected to the mains, and the other input terminal thereof is not connected to the mains. In this case, because the two input terminals of the LED driving circuit are not completely insulated from each other, if the input terminals of the LED driving circuit that are not connected to the mains are contacted with the human body, it is possible that the leakage current flows through the human body, there are safety risks in the assembly and maintenance process of LED lamps; meanwhile, a part of sockets which are used to mount LED lamps are provided with ballasts, which limits generality of the LED driving circuit.

SUMMARY OF THE INVENTION

Accordingly, it is necessary to provide an LED driving circuit which can limit the leakage current and be compatible with a ballast.

An light emitting diode (LED) driving circuit for controlling a leakage current and compatible with a ballast includes: an input circuit including buffer capacitors CX1, CX2, CX3; discharging resistor strings RX1, RX2, RX3; fuses F1, F2, F3; piezoresistors VR1, VR2, VR3; a plurality of output terminals each of which comprising a first rectifying connection terminal; a second rectifying connection terminal; a third rectifying connection terminal; and a fourth rectifying connection terminal; and a plurality of input terminals each of which including a first electrical energy connection terminal connected to the first rectifying connection terminal by the fuse F1; a second electrical energy connection terminal connected to the second rectifying connection terminal by the fuse F2; a third electrical energy connection terminal connected to the third rectifying connection terminal by the fuse F3; and a fourth electrical energy connection terminal directly connected to the fourth rectifying connection terminal; and a rectifying circuit connected to the input circuit; a power supply control module including a positive electrode connection terminal, a signal receiving terminal, a positive supply terminal, and a negative supply terminal; wherein the positive electrode connection terminal is connected to the rectifying circuit; an LED load module connected to the power supply control module; and an anti current leakage control module connected to the rectifying circuit and the power supply control module.

The above and other features of the invention including various novel details of construction and combinations of parts, and other advantages, will now be more particularly described with reference to the accompanying drawings and pointed out in the claims.

BRIEF DESCRIPTION OF THE DRAWINGS

These and other features of the present disclosure will become readily apparent upon further review of the following specification and drawings. In the drawings, like reference numerals designate corresponding parts throughout the views. Moreover, components in the drawings are not necessarily drawn to scale, the emphasis instead being placed upon clearly illustrating the principles of the present disclosure.

DETAILED DESCRIPTION OF THE EMBODIMENTS

Embodiments of the disclosure are described more fully hereinafter with reference to the accompanying drawings, in which preferred embodiments of the disclosure are shown. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. Herein terms used in the specification of the disclosure aim at describing the specific embodiments without limiting the disclosure. Term "and/or" used herein comprises any and all combination of one or more related item listed.

Figure 1:
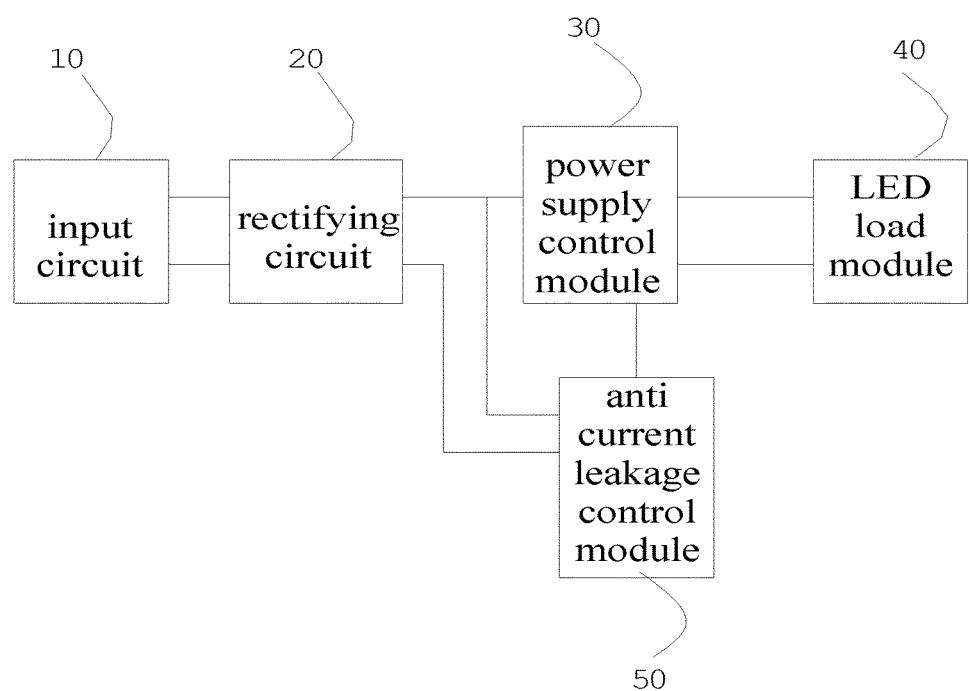
FIG. 1 is a block diagram of an LED driving circuit for controlling a leakage current and compatible with a ballast in an embodiment.
Figure 2:
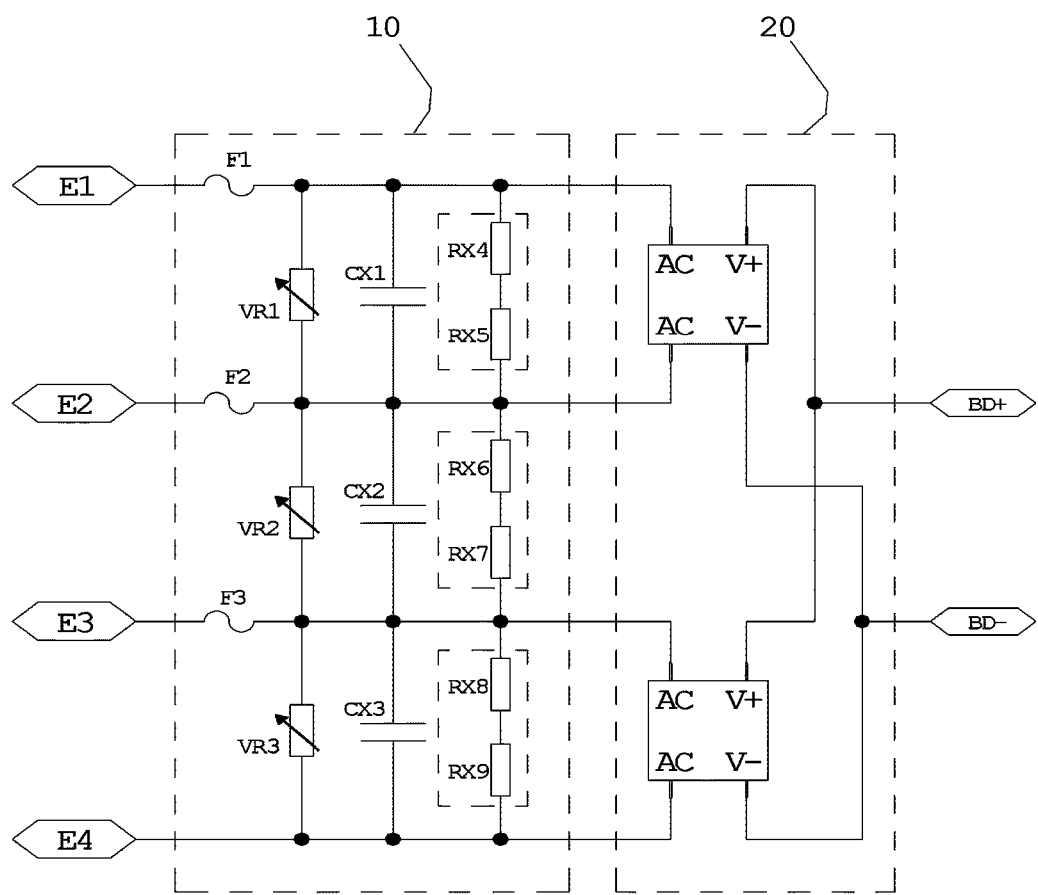
FIG. 2 is a schematic circuit diagram of an input circuit and a rectifying circuit of an LED driving circuit for controlling a leakage current and compatible with a ballast in an embodiment.
Figure 3:
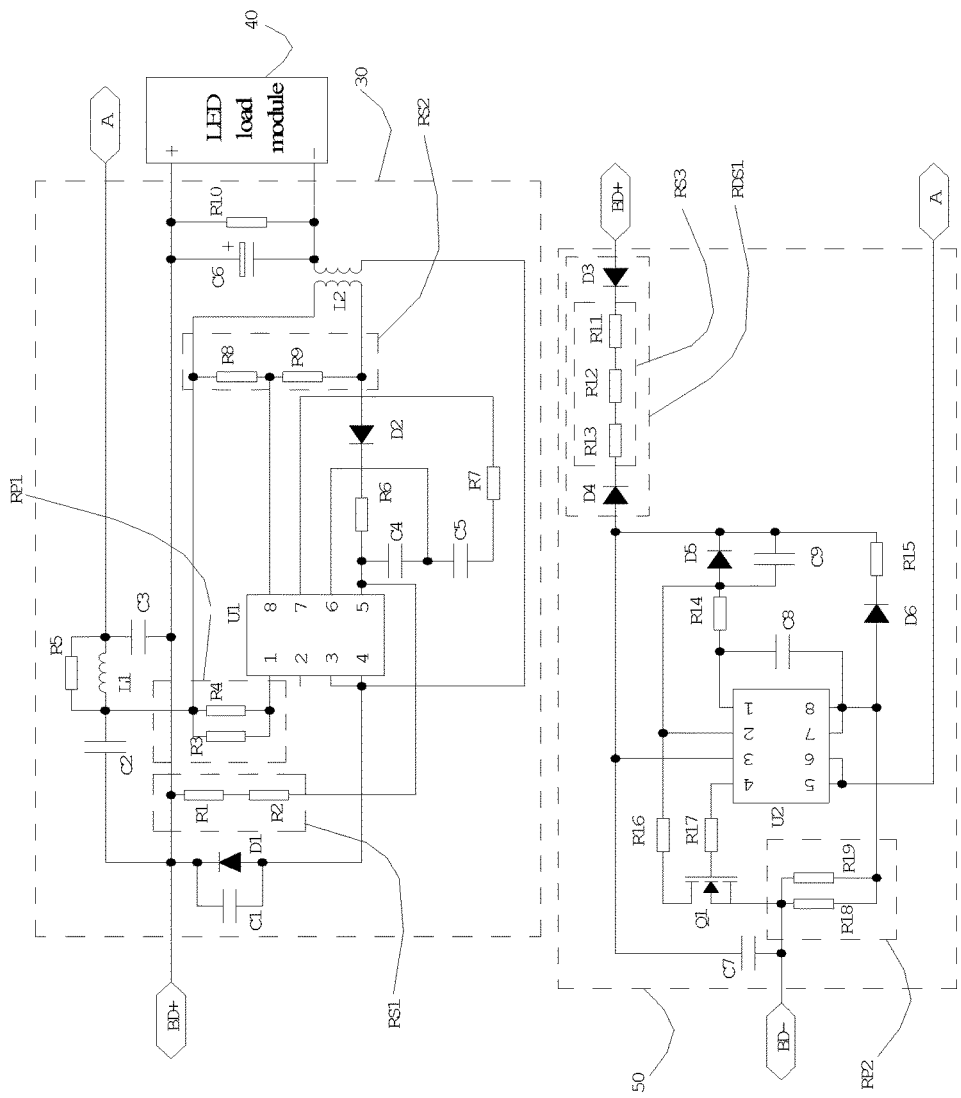
FIG. 3 is a schematic circuit diagram of a power supply control module, an anti current leakage control module and an LED load module of an LED driving circuit for controlling a leakage current and compatible with a ballast in an embodiment.

Referring to FIG. 1 to FIG. 3, the application provides an LED driving circuit for controlling a leakage current and compatible with a ballast, which is configured to perform conversion of electrical energy and produce a light source in an LED lamp. The LED lamp is connected to an output terminal of a socket in which a ballast can be mounted. The ballast mounted in the socket can be an instantaneous ballast, a quick acting ballast, a programmable ballast or a partial inductance ballast. The lamp is connected to the output terminal of the socket by a metal pin. The lamp can be connected to the output terminal of the socket by a plurality of connection manners. The LED driving circuit for controlling the leakage current and compatible with the ballast includes an input circuit 10, a rectifying circuit 20, a power supply control module 30 and an LED load module 40 connected sequentially; the LED driving circuit for controlling the leakage current and compatible with the ballast further includes an anti current leakage control module 50 connected to the rectifying circuit 20 and the power supply control module 30; the input circuit is connected to the metal pin in the lamps; the metal pin is connected to the output terminal of the socket; the input circuit 10 can buffer an overvoltage input by the external; the rectifying circuit 20 is configured to perform an initial rectifying operation; the anti current leakage control module 50 is configured to control the working status of the power supply control module 30 according to the voltage at the output terminals of the rectifying circuit 20.

The input circuit 10 includes a plurality of input terminals; the plurality of input terminals of the input circuit 10 are correspondingly connected to the metal pins of the lamp; there are a plurality of power supply connection manners between the lamp and the output terminals of the socket by the metal pins. In an embodiment, each input terminal of the input circuit 10 includes a first electrical energy connection terminal, a second electrical energy connection terminal, a third electrical energy connection terminal and a fourth electrical energy connection terminal; the input circuit 10 includes a plurality of output terminals; each output terminal of the input circuit 10 includes a first rectifying connection terminal, a second rectifying connection terminal, a third rectifying connection terminal and a fourth rectifying connection terminal; both the first electrical energy connection terminal and the second electrical energy connection terminal are connected to the mains; the input circuit 10 includes buffer capacitors CX1, CX2, CX3, discharging resistor strings RX1, RX2, RX3, fuses F1, F2, F3 and piezoresistors VR1, VR2, VR3; the first electrical energy connection terminal, the second electrical energy connection terminal, the third electrical energy connection terminal and the fourth electrical energy connection terminal can be connected to the first rectifying connection terminal, the second rectifying connection terminal, the third rectifying connection terminal and the fourth rectifying connection terminal partially or all by the fuses respectively. In an embodiment, the first electrical energy connection terminal, the second electrical energy connection terminal and the third electrical energy connection terminal are connected to the first rectifying connection terminal, the second rectifying connection terminal and the third rectifying connection terminal by the fuses F1, F2, F3 respectively, and the fourth electrical energy connection terminal is directly connected to the fourth rectifying connection terminal.

One terminal of the piezoresistor VR1 is connected to the first rectifying connection terminal of the input circuit 10; another terminal of the piezoresistor VR1 is connected to the second rectifying connection terminal of the input circuit 10; one terminal of the piezoresistor VR2 is connected to the second rectifying connection terminal of the input circuit 10; another terminal of the piezoresistor VR2 is connected to the third rectifying connection terminal of the input circuit 10; one terminal of the piezoresistor VR3 is connected to the third rectifying connection terminal of the input circuit 10; and another terminal of the piezoresistor VR3 is connected to the fourth rectifying connection terminal of the input circuit 10.

One terminal of the buffer capacitor CX1 is connected to the first rectifying connection terminal of the input circuit 10; another terminal of the buffer capacitor CX1 is connected to the second rectifying connection terminal of the input circuit 10; one terminal of the buffer capacitor CX2 is connected to the second rectifying connection terminal of the input circuit 10; another terminal of the buffer capacitor CX2 is connected to the third rectifying connection terminal of the input circuit 10; one terminal of the buffer capacitor CX3 is connected to the third rectifying connection terminal of the input circuit 10; another terminal of the buffer capacitor CX3 is connected to the fourth rectifying connection terminal of the input circuit 10.

One terminal of the discharging resistor string RX1 is connected to the first rectifying connection terminal of the input circuit 10; another terminal of the discharging resistor string RX1 is connected to the second rectifying connection terminal of the input circuit 10; one terminal of the discharging resistor string RX2 is connected to the second rectifying connection terminal of the input circuit 10; another terminal of the discharging resistor string RX2 is connected to the third rectifying connection terminal of the input circuit 10; one terminal of the discharging resistor string RX3 is connected to the third rectifying connection terminal of the input circuit 10; and another terminal of the discharging resistor string RX3 is connected to the fourth rectifying connection terminal of the input circuit 10. In an embodiment, the discharging resistor string RX1 includes series discharging resistors RX4, RX5; the discharging resistor string RX2 includes series discharging resistors RX6, RX7; the discharging resistor string RX3 includes series discharging resistors RX8, RX9.

An input terminal of the rectifying circuit 20 includes a first alternating connection terminal, a second alternating connection terminal, a third alternating connection terminal and a fourth alternating connection terminal; an output terminal of the rectifying circuit 20 includes a direct current positive electrode and a direct current negative electrode; the rectifying circuit 20 includes rectifying bridges BD1, BD2; two alternating terminals of the rectifying bridge BD1 serve as the first alternating connection terminal and the second alternating connection terminal of the rectifying circuit 20 respectively; two alternating terminals of the rectifying bridge BD1 are connected to the first rectifying connection terminal and the second rectifying connection terminal of the input circuit 10 respectively; two alternating terminals of the rectifying bridge BD2 serve as the third alternating connection terminal and the fourth alternating connection terminal of the rectifying circuit 20 respectively; two alternating terminals of the rectifying bridge BD2 are connected to the third rectifying connection terminal and the fourth rectifying connection terminal of the input circuit 10 respectively; a positive electrode output terminal of the rectifying bridge BD1 serves as the direct current positive electrode of the rectifying circuit 20; a negative electrode output terminal of the rectifying bridge BD1 serves as the direct current negative electrode of the rectifying circuit 20; the positive electrode output terminal of the rectifying bridge BD1 is connected to the positive electrode output terminal of the rectifying bridge BD2; the negative electrode output terminal of the rectifying bridge BD1 is connected to the negative electrode output terminal of the rectifying bridge BD2.

A power supply control module 30 is provided with a positive electrode connection terminal, a signal receiving terminal, a positive supply terminal and a negative supply terminal; the power supply control module 30 includes capacitors C1, C2, C3, C4, C5, C6, resistor strings RS1, RS2, a parallel resistor array RP1, resistors R5, R6, R7, R10, diodes D1, D2, inductors L1, L2 and a chip U1; the positive electrode connection terminal of the power supply control module 30 is connected to the direct current positive electrode of the rectifying circuit 20; one terminal of the capacitor C1 serves as the positive electrode connection terminal of the power supply control module 30; the one terminal of the capacitor C1 is connected to the direct current positive electrode of the rectifying circuit 20; a cathode of the diode D1 is connected to the one terminal of the capacitor C1, the cathode of the diode D1 is further connected to one terminal of the capacitor C2, the cathode of the diode D1 is further connected to one terminal of the resistor string RS1, the cathode of the diode D1 is further connected to one terminal of the capacitor C3, the cathode of the diode D1 is further connected to one terminal of the capacitor C6, and the cathode of the diode D1 is further connected to one terminal of the resistor R10; the chip U1 is provided with a chip select pin, a first floating pin, a second floating pin, a power supply pin, a compensation pin, a frequency adjustment pin and a conversion pin; an anode of the diode D1 is connected to another terminal of the capacitor C1, the anode of the diode D1 is further connected to the first floating pin and the second floating pin of the chip U1; another terminal of the resistor string RS1 is connected to the power supply pin of the chip U1; the other terminal of the capacitor C2 is connected to one terminal of the resistor R5, the other terminal of the capacitor C2 is further connected to one terminal of the inductor L1, the other terminal of the capacitor C2 is further connected to one terminal of the parallel resistor array RP1, and the other terminal of the capacitor C2 is further connected to one terminal of the resistor string RS2; another terminal of the resistor R5 serves as the signal receiving terminal of the power supply control module 30; the other terminal of the resistor R5 is connected to another terminal of the inductor L1, and the other terminal of the resistor R5 is connected to another terminal of the capacitor C3; another terminal of the parallel resistor array RP1 is connected to the chip select pin of the chip U1; the resistor string RS2 is provided with a node; the node of the resistor string RS2 is connected to the conversion pin of the chip U1; the inductor L2 is provided with a first connection terminal, a second connection terminal, a third connection terminal and a fourth connection terminal; the first connection terminal of the inductor L2 is connected to the one terminal of the resistor string RS2; the second connection terminal of the inductor L2 is connected to an anode of the diode D2, and the second connection terminal of the inductor L2 is further connected to another terminal of the resistor string RS2; a cathode of the diode D2 is connected to one terminal of the resistor R6; another terminal of the resistor R6 is connected to the power supply pin of the chip U1, and the other terminal of the resistor R6 is further connected to one terminal of the capacitor C4; another terminal of the capacitor C4 is connected to the compensation pin of the chip U1, and the other terminal of the capacitor C4 is further connected to one terminal of the capacitor C5; another terminal of the capacitor C5 is connected to one terminal of the resistor R7; another terminal of the resistor R7 is connected to the frequency adjustment pin of the chip U1; one terminal of the resistor R10 serves as the positive supply terminal of the power supply control module 30; another terminal of the resistor R10 serves as the negative supply terminal of the power supply control module 30; the other terminal of the resistor R10 is connected to the third connection terminal of the inductor L2, and another terminal of the capacitor C6 is connected to the third connection terminal of the inductor L2; the fourth connection terminal of the inductor L2 is connected to the first floating pin and the second floating pin of the chip U1.

In an embodiment, the resistor string RS1 includes resistors R1, R2; one terminal of the resistor R1 is connected to the cathode of the diode D1; another terminal of the resistor R1 is connected to one terminal of the resistor R2; another terminal of the resistor R2 is connected to the power supply pin of the chip U1.

In an embodiment, the parallel resistor array RP1 includes resistors R3, R4; one terminal of the resistor R3 is connected to the other terminal of the capacitor C2; one terminal of the resistor R4 is connected to the one terminal of the resistor R3; another terminal of the resistor R4 is connected to another terminal of the resistor R3; the other terminal of the resistor R3 is connected to the first floating pin and the second floating pin of the chip U1.

In an embodiment, the resistor string RS2 includes resistors R8, R9; one terminal of the resistor R8 is connected to the other terminal of the capacitor C2; another terminal of the resistor R8 is connected to the conversion pin of the chip U1; the other terminal of the resistor R8 is further connected to one terminal of the resistor R9; and another terminal of the resistor R9 is connected to the anode of the diode D2.

In an embodiment, in order to enhance the filter effect, the capacitor C6 is an electrolytic capacitor, a positive electrode of the capacitor C6 is connected to the cathode of the diode D1; and the negative electrode of the capacitor C6 is connected to the third connection terminal of the inductor L2.

The LED load module 40 is provided with a positive receiving terminal and a negative receiving terminal; the positive receiving terminal of the LED load module 40 is connected to the positive supply terminal of the power supply control module 30; the negative receiving terminal of the LED load module 40 is connected to the negative supply terminal of the power supply control module 30; a plurality of LED modules are provided in the LED load module 40; and the plurality of LED modules are configured to emit LED light.

The anti current leakage control module 50 includes a plurality of input terminals and a plurality of control terminals; wherein each input terminal of the anti current leakage control module 50 includes a positive electrode accessing terminal and a negative electrode accessing terminal; and each control terminal of the anti current leakage control module 50 includes a current leakage adjustment terminal; the positive electrode accessing terminal of the anti current leakage control module 50 is connected to the direct current positive electrode of the rectifying circuit 20; the negative electrode accessing terminal of the anti current leakage control module 50 is connected to the direct current negative electrode of the rectifying circuit 20; and the current leakage adjustment terminal of the anti current leakage control module 50 is connected to the signal receiving terminal of the power supply control module 30. The anti current leakage control module 50 includes capacitors C7, C8, C9, a clamping element string RDS1, a parallel resistor array RP2, resistors R14, R15, R16, R17, diodes D5, D6, a switching transistor Q1 and a chip U2; wherein the chip U2 is provided with a compensation pin, a loop pin, a power supply pin, a driving pin, a first control pin, a second control pin, a first detection pin and a second detection pin; the switching transistor Q1 is provided with a low level terminal, a high level terminal and a switching control terminal; one terminal of the clamping element string RDS1 serves as the positive electrode accessing terminal of the anti current leakage control module 50; the one terminal of the clamping element string RDS1 is connected to the direct current positive electrode of the rectifying circuit 20; another terminal of the clamping element string RDS1 is connected to a cathode of the diode D5; the cathode of the diode D5 is connected to one terminal of the capacitor C7, the cathode of the diode D5 is further connected to the power supply pin of the chip U2, the cathode of the diode D5 is further connected to one terminal of the capacitor C9, and the cathode of the diode D5 is further connected to one terminal of the resistor R15; an anode of the diode D5 is connected to one terminal of the resistor R16, the anode of the diode D5 is further connected to the loop pin of the chip U2, the anode of the diode D5 is further connected to one terminal of the resistor R14, and the anode of the diode D5 is further connected to another terminal of the capacitor C9; another terminal of the capacitor C7 serves as the negative electrode accessing terminal of the power supply control module 30; the other terminal of the capacitor C7 is connected to the direct current negative electrode of the rectifying circuit 20, the other terminal of the capacitor C7 is further connected to one terminal of the parallel resistor array RP2, and the other terminal of the capacitor C7 is further connected to the low level terminal of the switching transistor Q1; another terminal of the resistor R15 is connected to a cathode of the diode D6; an anode of the diode D6 is connected to the first detection pin and the second detection pin of the chip U2, the anode of the diode D6 is further connected to another terminal of the parallel resistor array RP2, and the anode of the diode D6 is further connected to one terminal of the capacitor C8; another terminal of the resistor R16 is connected to the high level terminal of the switching transistor Q1; another terminal of the resistor R14 is connected to the compensation pin of the chip U2, and the other terminal of the resistor R14 is further connected to another terminal of the capacitor C8; one terminal of the resistor R17 is connected to the switching control terminal of the switching transistor Q1; another terminal of the resistor R17 is connected to the driving pin of the switching transistor Q1; the first detection pin of the chip U2 serves as the current leakage adjustment terminal of the anti current leakage control module and is connected to the signal receiving terminal of the power supply control module; and the second detection pin of the chip U2 is connected to the first detection pin thereof.

In an embodiment, the clamping element string RDS1 includes a resistor string RS3 and diodes D3, D4; the resistor string RS3 includes resistors R11, R12, R13; an anode of the diode D3 serves as one terminal of the clamping element string RDS1 and is connected to the direct current positive electrode of the rectifying circuit; a cathode of the diode D3 is connected to one terminal of the resistor R11; another terminal of the resistor R11 is connected to one terminal of the resistor R12, another terminal of the resistor R12 is connected to one terminal of the resistor R13, another terminal of the resistor R13 is connected to a cathode of the diode D4; an anode of the diode D4 serve as another terminal of the clamping element string RDS1 and is connected to the cathode of the diode D5.

In an embodiment, the switching transistor Q1 is a MOS transistor; the low level terminal, the high level terminal and the switching control terminal of the switching transistor Q1 are a source, a drain and a gate respectively; the source of the switching transistor Q1 is connected to the other terminal of the capacitor C7; the drain of the switching transistor Q1 is connected to the other terminal of the resistor R16; and the gate of the switching transistor Q1 is connected to the one terminal of the resistor R17.

In an embodiment, the parallel resistor array RP2 includes resistor R18, R19; one terminal of the resistor R18 is connected to the other terminal of the capacitor C7; one terminal of the resistor R19 is connected to the one terminal of the resistor R18; another terminal of the resistor R18 is connected to the anode of the diode D6; and another terminal of the resistor R19 is connected to the other terminal of the resistor R18.

In the application, by providing buffer capacitors CX1, CX2, CX3 between input terminals of the input circuit 10, the voltage between two terminals of the capacitor cannot be changed, so that when the LED driver in series with the ballast in the lamp begins to start, the elements therein cannot be damaged due to shock of the high voltage; the discharging resistor strings RX10, RX20, RX30 are configured to discharge electric charges of the buffer capacitors CX1, CX2, CX3 when the LED driving circuit stops to work, so that voltages of the buffer capacitors CX1, CX2, CX3 are reduced, which avoids human from damage.

The input circuit 10 can be connected to the mains by any two of the four input terminals such as the first electric energy connection terminal, the second electric energy connection terminal, the third electric energy connection terminal and the fourth electric energy connection terminal to form a loop; the first electric energy connection terminal of the input circuit 10 is connected to the live line or the neutral line of the mains, and the second electric energy connection terminal, the third electric energy connection terminal or the fourth electric energy connection terminal are connected to the neutral line or the live line of the mains. In another embodiment, the second electric energy connection terminal of the input circuit 10 is connected to the live line or the neutral line of the mains, and the first electric energy connection terminal, the third electric energy connection terminal or the fourth electric energy connection terminal are connected to the neutral line or the live line of the mains. In another embodiment, the third electric energy connection terminal of the input circuit 10 is connected to the live line or the neutral line of the mains, and the first electric energy connection terminal, the second electric energy connection terminal or the fourth electric energy connection terminal are connected to the neutral line or the live line of the mains. In another embodiment, the fourth electric energy connection terminal of the input circuit 10 is connected to the live line or the neutral line of the mains, and the first electric energy connection terminal, the second electric energy connection terminal or the third electric energy connection terminal are connected to the neutral line or the live line of the mains.

The input circuit 10 can be connected to the ballast by a plurality of combinations of the four input terminals such as the first electric energy connection terminal, the second electric energy connection terminal, the third electric energy connection terminal and the fourth electric energy connection terminal to obtain the electrical energy by two output terminals of the ballast. In an embodiment that enables to connect with an instantaneous ballast, a quick acting ballast, a programmable ballast or a partial inductance ballast, the first electric energy connection terminal and the second electric energy connection terminal are connected to one output terminal of the ballast; the third electric energy connection terminal and the fourth electric energy connection terminal are connected to another output terminal of the ballast. In an embodiment that enables to connect with an instantaneous ballast, the first electric energy connection terminal is connected to one output terminal of the ballast; and the second electric energy connection terminal is connected to another output terminal of the ballast. In an embodiment that enables to connect with an instantaneous ballast, the third electric energy connection terminal is connected to one output terminal of the ballast; and the fourth electric energy connection terminal is connected to another output terminal of the ballast.

In various embodiments, the input circuit 10 can implement compatibility of the ballast and the LED driving circuit for controlling a leakage current and compatible with the ballast. That is to say, the LED driving circuit for controlling a leakage current and compatible with the ballast can be protected from the external over voltage. In various embodiments, the input circuit 10 can protect the LED driving circuit from short or overload.

after the input circuit 10 is provided in the LED driving circuit, the lamp provided with the LED driving circuit can be compatible with the socket mounted with the ballast; the lamp provided with the LED driving circuit can be also connected to the mains; the rectifying circuit 20 can be configured to initially rectify the alternating current output by the input circuit 10 by the rectifying bridges BD1, BD2 therein, and output the direct current from the direct current positive electrode and the direct current negative electrode.

The power supply control module 30 obtains the electrical energy input from the rectifying circuit 20; and the power supply control module 30 provides the power supply of stable voltage and current to the LED load module 40.

A pulse-width modulation switching transistor is integrated in the chip U1. in the case that the LED driving circuit for controlling a leakage current and compatible with the ballast is reliably connected to the mains, when the power supply control module 30 is started, the chip U1 obtains the electrical energy by the resistor string RS1, and then performs the starting operation; when the power supply control module 30 has been started, the inductor L2 provides the power supply to the chip U1 by the diode D2 and the resistor R6; one function of the parallel resistor array RP1 is to detect the current flowing through the LED load module 40 for the chip U1; the conversion pin of the chip U1 is configured to adjust the current inside the power supply control module 30 according to the feedback voltage of the parallel resistor array RP1, so that the voltage at the output terminals of the power supply control module 30 can be stable and the stable current flows through the LED load module; when the voltage at the other terminal of the parallel resistor array RP1 is reduced to a certain extent, the pulse-width modulation switching transistor integrated in the chip U1 is turned on; when the voltage at the other terminal of the parallel resistor array RP1 is increased to a certain extent, the pulse-width modulation switching transistor integrated in the chip U1 is turned off.

The anti current leakage control module 50 can detect change in the voltage at the output terminals of the rectifying circuit 20 and adjust the working status of the power supply control module 30; when the lamps are connected to the mains normally, i.e. when the input terminals of the input circuit 10 are reliably connected to the mains, the power supply control module 30 adjusts the voltage output by the rectifying circuit 20, so that the stable current flows through the LED load module.

In an embodiment, the chip U2 is connected to the direct current positive electrode and the direct current negative electrode of the rectifying circuit by the clamping element string RDS1 and the parallel resistor array RP2, so as to obtain the output voltage status of the rectifying circuit; when the lamps are connected to the mains normally, the driving pin of the chip U2 applies the bias voltage to the switching control terminal of the switching transistor Q1 by the resistor R17, so that the switching transistor Q1 is turned on, which protects the chip U2 from breakdown of the chip U2.

When the lamps are not connected to the mains normally, i.e. when only a part of the input terminals of the input circuit 10 are reliably connected to the mains, the remaining input terminals thereof are not connected to the mains, the anti current leakage control module 50 identifies decrease in the voltage between the output terminals of the rectifying circuit 20, the anti current leakage control module 50 transmits the potential signal to the power supply control module 30 by its current leakage adjustment terminal and the signal receiving terminal of the power supply control module 30; after the power supply control module 30 receives the potential signal, the power supply control module 30 stops to adjust the voltage output by the rectifying circuit 20, and then the current flowing through the LED load module 40 is reduced; after power supply control module 30 has stopped to perform the voltage adjustment operation, the inside resistance between the output terminals of the anti current leakage control module 50 will be adjusted, the high resistance therein will occur between the output terminals of the anti current leakage control module 50.

In an embodiment, when the lamps are not connected to the mains normally, the voltage between the direct current positive electrode and the direct current negative electrode of the rectifying circuit 20 is reduced; when the chip U2 detects decrease in the voltage between the direct current positive electrode and the direct current negative electrode of the rectifying circuit 20, the first control pin and the second control pin of the chip U2 output a high level, so that the voltage at the other terminal of the parallel resistor array RP1 is increased, the pulse-width modulation switching transistor integrated in the chip U1 continues to be turned off due to increase in the voltage at the other terminal of the parallel resistor array RP1; meanwhile, when the chip U2 detects decrease in the voltage between the direct current positive electrode and the direct current negative electrode of the rectifying circuit 20, the chip U2 turns off the switching transistor Q1 by resistor R17, so that the inside resistance between the positive electrode accessing terminal and the negative electrode accessing terminal of the anti current leakage control module 50.

The high resistance therein occurs between the input terminals of the input circuit 10, the high resistance therein occurs between the output terminals of the input circuit 10, the high resistance therein occurs between the input terminals of the rectifying filter circuit, and the high resistance therein occurs between the output terminals of the rectifying filter circuit. Therefore, when the lamps are not connected to the mains normally, there is no a low resistance passage outside the output terminals of the rectifying filter circuit; when the leakage current occurs inside the lamps, the leakage current flowing through the LED driving circuit for controlling a leakage current can be controlled under the safe value, so that human safety can be ensured.

In an embodiment, the LED driving circuit for controlling a leakage current and compatible with a ballast can effectively limit magnitude of the produced leakage current by providing the anti current leakage control module which can detect a voltage output by the rectifying circuit, which protects user from the electrical shock due to the leakage current during assembly and maintenance of LED lamps; meanwhile, by adjusting the structure of the input circuit, the LED driving circuit can be compatible with the ballast.

Although the disclosure is illustrated and described herein with reference to specific embodiments, the disclosure is not intended to be limited to the details shown. Rather, various modifications may be made in the details within the scope and range of equivalents of the claims and without departing from the disclosure.

What is claimed is:

1. A light emitting diode (LED) driving circuit for controlling a leakage current and compatible with a ballast, comprising:
    an input circuit comprising:
        a first buffer capacitor (CX1), a second buffer capacitor (CX2), and a third buffer capacitor (CX3);
        a first discharging resistor string (RX1), a second discharging resistor string (RX2), and a third discharging resistor string (RX3);
        a first fuse (F1), a second fuse (F2), and a third fuse (F3);
        a first piezoresistor (VR1), a second piezoresistor (VR2), and a third piezoresistor (VR3);
        a plurality of output terminals each of which comprising:
        a first rectifying connection terminal;
        a second rectifying connection terminal;
        a third rectifying connection terminal; and
        a fourth rectifying connection terminal; and
        a plurality of input terminals each of which comprising:
        a first electrical energy connection terminal connected to the first rectifying connection terminal by the first fuse (F1);
        a second electrical energy connection terminal connected to the second rectifying connection terminal by the second fuse (F2);
        a third electrical energy connection terminal connected to the third rectifying connection terminal by the third fuse (F3); and
        a fourth electrical energy connection terminal directly connected to the fourth rectifying connection terminal; and
    a rectifying circuit connected to the input circuit;
    a power supply control module comprising a positive electrode connection terminal, a signal receiving terminal, a positive supply terminal, and a negative supply terminal; wherein the positive electrode connection terminal is connected to the rectifying circuit;
    an LED load module connected to the power supply control module; and
    an anti current leakage control module connected to the rectifying circuit and the power supply control module,
    wherein one terminal of the first piezoresistor (VR1) is connected to the first rectifying connection terminal; another terminal of the first piezoresistor (VR1) is connected to the second rectifying connection terminal; one terminal of the second piezoresistor (VR2) is connected to the second rectifying connection terminal; another terminal of the second piezoresistor (VR2) is connected to the third rectifying connection terminal; one terminal of the third piezoresistor (VR3) is connected to the third rectifying connection terminal; and another terminal of the third piezoresistor (VR3) is connected to the fourth rectifying connection terminal.

2. The LED driving circuit of claim 1,
    wherein one terminal of the first buffer capacitor (CX1) is connected to the first rectifying connection terminal; another terminal of the first buffer capacitor (CX1) is connected to the second rectifying connection terminal; one terminal of the second buffer capacitor (CX2) is connected to the second rectifying connection terminal; another terminal of the second buffer capacitor (CX2) is connected to the third rectifying connection terminal; one terminal of the third buffer capacitor (CX3) is connected to the third rectifying connection terminal; another terminal of the third buffer capacitor (CX3) is connected to the fourth rectifying connection terminal; one terminal of the first discharging resistor string (RX1) is connected to the first rectifying connection terminal; another terminal of the first discharging resistor string (RX1) is connected to the second rectifying connection terminal; one terminal of the second discharging resistor string (RX2) is connected to the second rectifying connection terminal; another terminal of the second discharging resistor string (RX2) is connected to the third rectifying connection terminal; one terminal of the third discharging resistor string (RX3) is connected to the third rectifying connection terminal; and another terminal of the third discharging resistor string (RX3) is connected to the fourth rectifying connection terminal.

3. The LED driving circuit of claim 1, wherein the power supply control module comprises a first capacitor (C1), a second capacitor (C2), a third capacitor (C3), a fourth capacitor (C4), a fifth capacitor (C5), a sixth capacitor (C6), a first resistor (RS1), a second resistor (RS2), a first parallel resistor array (RP1), a fifth resistor (R5), a sixth resistor (R6), a seventh resistor (R7), a tenth (R10), a first diode (D1), a second diode (D2), a first inductor (L1), a second inductor (L2), and a first chip (U1);
    wherein one terminal of the first capacitor (C1) serves as the positive electrode connection terminal; the one terminal of the first capacitor (C1) is connected to the rectifying circuit; a cathode of the first diode (D1) is connected to the one terminal of the first capacitor (C1), one terminal of the second capacitor (C2), one terminal of the first resistor string (RS1), one terminal of the third capacitor (C3), one terminal of the sixth capacitor (C6), and one terminal of the tenth resistor (R10); the first chip (U1) is provided with a chip select pin, a first floating pin, a second floating pin, a power supply pin, a compensation pin, a frequency adjustment pin and a conversion pin; an anode of the first diode (D1) is connected to another terminal of the first capacitor (C1), the first floating pin and the second floating pin; another terminal of the first resistor string (RS1) is connected to the power supply pin; the other terminal of the second capacitor (C2) is connected to one terminal of the fifth resistor (R5), one terminal of the first inductor (L1), one terminal of the first parallel resistor array (RP1) and one terminal of the second resistor string (RS2); another terminal of the fifth resistor (R5) serves as the signal receiving terminal; the other terminal of the fifth resistor (R5) is connected to another terminal of the first inductor (L1) and another terminal of the third capacitor (C3); another terminal of the first parallel resistor array (RP1) is connected to the chip select pin; the second resistor string (RS2) is provided with a node; the node is connected to the conversion pin; the second inductor (L2) is provided with a first connection terminal, a second connection terminal, a third connection terminal and a fourth connection terminal; the first connection terminal is connected to the one terminal of the second resistor string (RS2); the second connection terminal is connected to an anode of the second diode (D2) and another terminal of the second resistor string (RS2); a cathode of the second diode (D2) is connected to one terminal of the sixth resistor (R6); another terminal of the sixth resistor (R6) is connected to the power supply pin and one terminal of the fourth capacitor (C4); another terminal of the fourth capacitor (C4) is connected to the compensation pin and one terminal of the fifth capacitor (C5); another terminal of the fifth capacitor (C5) is connected to one terminal of the seventh resistor (R7); another terminal of the seventh resistor (R7) is connected to the frequency adjustment pin; one terminal of the tenth resistor (R10) serves as the positive supply terminal; another terminal of the tenth resistor (R10) serves as the negative supply terminal; the other terminal of the tenth resistor (R10) and another terminal of the sixth capacitor (C6) are connected to the third connection terminal; the fourth connection terminal is connected to the first floating pin and the second floating pin.

4. The LED driving circuit of claim 3, wherein each of the first resistor string (RS1) and second resistor string (RS2) comprises a plurality of resistors in series; the first parallel resistor array (RP1) comprises a plurality of resistors in parallel; the sixth capacitor (C6) is an electrolytic capacitor, a positive electrode of the sixth capacitor (C6) is connected to the cathode of the first diode (D1); the negative electrode of the sixth capacitor (C6) is connected to the third connection terminal.

5. The LED driving circuit of claim 1, wherein the anti current leakage control module comprises a plurality of input terminals and a plurality of control terminals.

6. The LED driving circuit of claim 5, wherein each input terminal of the anti current leakage control module comprises a positive electrode accessing terminal and a negative electrode accessing terminal; and each control terminal of the anti current leakage control module comprises a current leakage adjustment terminal.

7. The LED driving circuit of claim 6, wherein the anti current leakage control module further comprises a seventh capacitor (C7), a eighth capacitor (C8), a ninth capacitor (C9), a first clamping element string (RDS1), a second parallel resistor array (RP2), a fourteenth resistor (R14), a fifteenth resistor (R15), a sixteenth resistor (R16), a seventeenth resistor (R17), a fifth diode (D5), a sixth diode (D6), a first switching transistor (Q1) and a second chip (U2);
wherein the second chip (U2) is provided with a compensation pin, a loop pin, a power supply pin, a driving pin, a first control pin, a second control pin, a first detection pin and a second detection pin; the first switching transistor is provided with a low level terminal, a high level and a switching control terminal; one terminal of the first clamping element string (RDS1) serves as the positive electrode accessing terminal; the one terminal of the first clamping element string (RDS1) is connected to the rectifying circuit; another terminal of the first clamping element string (RDS1) is connected to a cathode of the fifth diode (D5); the cathode of the fifth diode (D5) is connected to one terminal of the seventh capacitor (C7), the power supply pin, one terminal of the ninth capacitor (C9) and one terminal of the fifteenth resistor (R15), an anode of the fifth diode (D5) is connected to one terminal of the sixteenth resistor (R16), the loop pin, one terminal of the fourteenth resistor (R14) and another terminal of the ninth capacitor (C9); another terminal of the seventh capacitor (C7) serves as the negative electrode accessing terminal; the other terminal of the seventh capacitor (C7) is connected to the rectifying circuit, one terminal of the second parallel resistor array (RP2) and the low level terminal; another terminal of the fifteenth resistor (R15) is connected to a cathode of the sixth diode (D6); an anode of the sixth diode (D6) is connected to the first detection pin, the second detection pin, another terminal of the second parallel resistor array (RP2) and one terminal of the eighth capacitor (C8); another terminal of the sixteenth resistor (R16) is connected to the high level terminal; another terminal of the fourteenth resistor (R14) is connected to the compensation pin and another terminal of the eighth capacitor (C8); one terminal of the seventeenth resistor (R17) is connected to the switching control terminal; another terminal of the seventeenth resistor (R17) is connected to the driving pin; the first detection pin serves as the current leakage adjustment terminal and is connected to the power supply control module; the second detection pin is connected to the first detection pin.

8. The LED driving circuit of claim 7, wherein the first clamping element string (RDS1) comprises a third resistor string (RS3) and a third diode (D3), a fourth diode (D4), an anode of the third diode (D3) serves as one terminal of the first clamping element string (RDS1) and is connected to the rectifying circuit; a cathode of the third diode (D3) is connected to one terminal of the third resistor string (RS3); another terminal of the third resistor (R13) is connected to a cathode of the fourth diode (D4); an anode of the fourth diode (D4) serve as another terminal of the first clamping element string (RDS1) and is connected to the cathode of the fifth diode (D5);

the first switching transistor (Q1) is a MOS transistor; the low level terminal, the high level and the switching control terminal are a source, a drain and a gate of the MOS transistor respectively; the source is connected to the other terminal of the seventh capacitor (C7); the drain is connected to the other terminal of the sixteenth resistor (R16); the gate is connected to the one terminal of the seventeenth resistor (R17).

9. The LED driving circuit of claim 1, wherein an input terminal of the rectifying circuit comprises a first alternating connection terminal and a second alternating connection terminal; an output terminal of the rectifying circuit comprises a direct current positive electrode and a direct current negative electrode; an input terminal of the anti current leakage control module comprises a positive electrode accessing terminal and a negative electrode accessing terminal; and a control terminal of the anti current leakage control module comprises a current leakage adjustment terminal.

10. The LED driving circuit of claim 9, wherein the positive electrode connection terminal is connected to the direct current positive electrode; the positive supply terminal is connected to the positive receiving terminal; the negative supply terminal is connected to the negative receiving terminal; the signal receiving terminal is connected to the current leakage adjustment terminal; the positive electrode accessing terminal is connected to the direct current positive electrode; the negative electrode accessing terminal is connected to the direct current negative electrode.

* * * * *